March 25, 1952  J. T. RISSE  2,590,430
HYDRAULIC MASTER CYLINDER
Filed Feb. 16, 1951
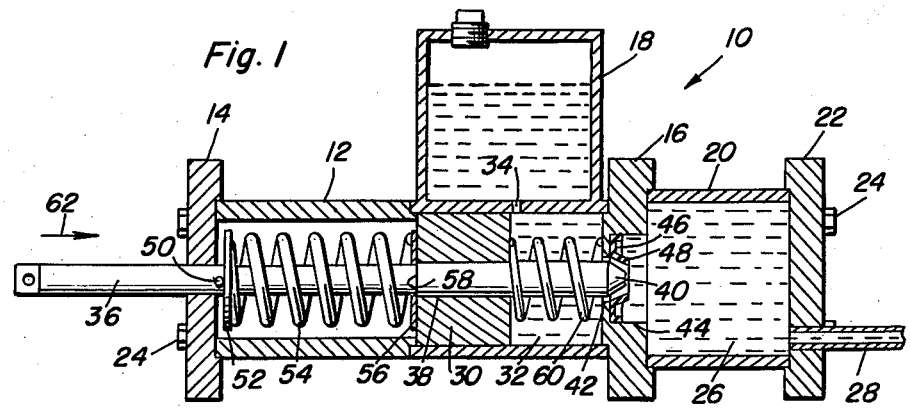
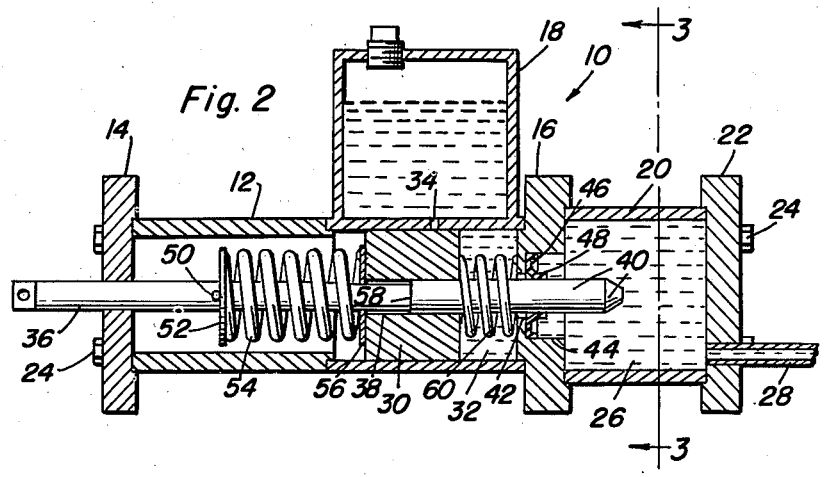
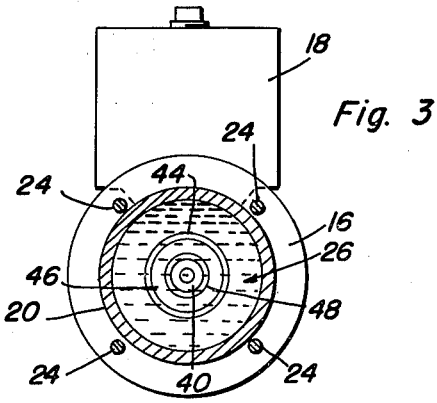
John T. Risse
INVENTOR.

Patented Mar. 25, 1952

2,590,430

UNITED STATES PATENT OFFICE 2,590,430

HYDRAULIC MASTER CYLINDER

John T. Risse, Eldora, Iowa

Application February 16, 1951, Serial No. 211,327

3 Claims. (Cl. 60—54.6)

This invention relates to new and useful improvements and structural refinements in hydraulic master cylinders, and the principal object of the invention is to provide a cylinder of the character herein described which is capable of two-stage operation by first exerting relatively low pressure in the hydraulic system by displacement of a relatively large volume of fluid, and then exerting relatively high pressure in the hydraulic system by displacement of a relatively small amount of fluid, this facilitating efficient, progressive control of a hydraulic device or devices which the master cylinder actuates.

Some of the advantages of the invention reside in its simplicity of construction, dependability of operation and adaptability for use in hydraulic systems of different types.

Primarily, the invention is intended for use in hydraulic brake systems of automobiles, etc., but obviously it may be utilized in other environments.

With the above more important objects and features in view and such other objects and features as may become apparent as this specification proceeds, the invention consists essentially in the construction and arrangement of parts as shown in the accompanying drawing, in which:

Figure 1 is a longitudinal sectional view of the hydraulic master cylinder in its initial position;

Figure 2 is a longitudinal sectional view, similar to that shown in Figure 1, but illustrating the master cylinder in its position representative of an ultimate; and Figure 3 is a transverse sectional view, taken substantially in the plane of the line 3—3 of Figure 2.

Like characters of reference are employed to designate like parts in the specification and throughout the several views.

Referring now to the accompanying drawing in detail, the invention consists of a hydraulic master cylinder which is designated generally by the reference character 10 and embodies in its construction an elongated, substantially cylindrical housing 12 provided with end walls 14, 16, while a hydraulic fluid reservoir 18 is provided on top of the housing 12 adjacent the end wall 16, as shown.

A cylindrical housing extension 20 is provided at the outside of the end wall 16 coaxially with the main housing 12, the extension 20 having an outer end wall 22. The end walls 14, 16 and 22 are preferably of a greater diameter than the housing 12 and extension 20, and a plurality of tie rods 24 extend through marginal edge portions of the walls 14, 16 and 22, whereby to secure the entire assembly together.

The extension 20 affords therein what may be called a high pressure fluid chamber 26 having an outlet duct 28 which extends through the end wall 22 and communicates with a hydraulic device or devices which the master cylinder is intended to actuate.

What may be called a low pressure piston 30, of a relatively large diameter, is slidable in the housing 12, and a portion of the housing 12 between the piston 30 and the end wall 16 affords a low pressure fluid chamber 32 which communicates with the reservoir 18 through the medium of a passage 34 which is uncovered by the piston 30 when the latter is in its initial position as shown in Figure 1.

A reciprocable actuating rod 36 extends slidably through the end wall 14 into the housing 12 and is also slidable in a bore 38 of the piston 30, the inner end portion of the rod 36 having a frusto-conical extremity and constituting what may be called a high pressure piston 40 which is of a substantially smaller diameter than the piston 30.

The end wall 16 is provided with a passage 42, counterbored, as at 44, which passage connects the fluid chambers 26, 32, and what may be referred to as a check-valving seal 46 is mounted in the counterbore 44 and has a frusto-conical, apertured center portion 48 which is directed toward the chamber 26, as shown.

When the actuating rod 36 is in its initial position, as shown in Figure 1, the high pressure piston 40 extends partly into the seal 46, but sufficient space exists between the piston 40 and the seal portion 48 to permit flow of fluid from the chamber 32 into the chamber 26, or vice versa.

A transverse stop pin 50 is provided in the rod 36 and projects laterally from the rod so as to abut the inner surface of the end wall 14 when the rod 36 is in its initial position, as shown in Figure 1, a washer 52 being positioned on the rod 36 at the inside of the pin 50 to abut one end of a compression spring 54. The other end of this spring abuts a washer 56 which, in turn, abuts the piston 30, it being noted that a shoulder 58 is provided intermediate the ends of the rod 36, which shoulder abuts the washer 56 when the device is in its initial position as shown in Figure 1.

Finally, it is to be observed that a compression spring 60, which is substantially weaker than the spring 54, is interposed between the piston 30 and the end wall 16.

Having thus described the construction of the invention, the operation thereof will now be explained.

Assuming the device to be in its initial position as shown in Figure 1, the piston 30 will uncover the passage 34 so that the hydraulic system may be filled by fluid from the reservoir 18, the piston 40 being spaced from the seal portion 48, so that communication in both directions is maintained between the chambers 26, 32 to facilitate equalization of fluid pressure therein.

Assuming, now, that the actuating rod 36 is slid to the right, that is, in the direction of the arrow 62, the piston 30 will first cover the passage 34 while at substantially the same time the piston 40 will frictionally engage the portion 48 of the seal 46, and as the piston 30 continues in its movement to the right, fluid in the chamber 32 will be expelled into the chamber 26 by being forced between the piston 40 and the frusto-conical portion 48 of the seal 46, whereby a relatively large volume of fluid will be displaced at relatively low pressure to initially actuate a hydraulic device or devices connected to the duct 28.

It should be explained at this point that the piston 30, which is not secured to the rod 36, is slid to the right only by the action of the compression spring 54 which is possible only when the rod 36 itself is slid to the right so that the shoulder 58 of the rod may recede from the washer 56, as illustrated in Figure 2. Of course, the spring 54, being stronger than the spring 60, overcomes the pressure of the latter spring in forcing the piston 30 to the right, as aforesaid.

When a sufficient amount of fluid has been displaced under low pressure to initially actuate a fluid pressure-responsive device connected to the duct 28, and when that low pressure fluid displacement is incapable to further actuate that device so as to overcome whatever load may be placed on the latter, the low pressure piston 30 will come to a stop, such as for example, at a point illustrated in Figure 2, but sliding of the rod 36 in the direction of the arrow 62 will project the high pressure piston 40 into the high pressure fluid chamber 26, thus furnishing a small volume displacement of fluid at proportionately higher pressure to further actuate the fluid pressure-responsive device to which the master cylinder is connected.

It will be apparent from the foregoing that in this manner the operation of the hydraulic system is in two stages, namely, a low pressure, high volume displacement stage, and a high pressure, low volume displacement stage, and it is to be noted that once the high pressure piston 40 comes in engagement with the portion 48 of the seal 46, fluid may pass through the seal portion 48 from the chamber 32 into the chamber 26, but not from the chamber 26 into the chamber 32. This is assured by the frusto-conical configuration of the seal portion 48 which frictionally engages the piston 40.

When the actuating rod 36 is slid to the left, that is, to the initial position shown in Figure 1, the spring 60 will counteract the resiliency of the spring 54 in sliding the piston 30 to its initial position, this representing the sole function of the spring 60. When that occurs, the high pressure piston 40 will be spaced from the seal portion 48 and the fluid under pressure in the chamber 26 and duct 28 will be able to return into the chamber 32 to effect equalization.

It is believed that the advantages and use of the invention will be clearly understood from the foregoing disclosure, and, accordingly, further description thereof at this point is deemed unnecessary.

Having described the invention, what is claimed as new is:

1. In a hydraulic master cylinder, the combination of an elongated housing having first and second end walls, a housing extension provided at the outside of the second end wall and affording a high pressure fluid chamber having an outlet port, a relatively large low pressure piston slidable in said housing, a portion of the housing between said piston and said second end wall constituting a low pressure fluid chamber, said second end wall being provided with a fluid passage connecting the high and low pressure chambers, a reciprocable actuating rod extending slidably through the first end wall into the housing and having its intermediate portion slidable in said low pressure portion, a compression spring provided in the housing for urging the low pressure piston toward said passage when said actuating rod is slid inwardly, a check-valving seal provided in said passage, the inner end portion of said actuating rod constituting a relatively small high pressure piston engageable with said seal and projectable into the high pressure chamber when said actuating rod is slid inwardly and the low pressure piston is stationary, and a second compression spring provided in said housing for urging the low pressure piston to its initial position when the actuating rod is slid outwardly, a shoulder provided intermediate the ends of said actuating rod, a collar slidable on said rod, and a stop provided on said rod adjacent said first end wall, one end of the first-mentioned spring abutting said stop and the other end thereof abutting said collar whereby to urge the latter against said shoulder, the second-mentioned spring urging the low pressure piston against said collar.

2. The device as defined in claim 1 wherein the first and second-mentioned springs are disposed at opposite sides of the low pressure piston, the second spring being substantially weaker than the first spring.

3. In a master cylinder, a housing having a first fluid chamber and a fluid reservoir communicating therewith, a housing extension having a second fluid chamber in communication with said first chamber and having an outlet port therein, a large piston slidable in said housing and having an axial bore therethrough, a small piston being slidably received in said bore, a shoulder intermediate the ends of said small piston, a stop on said small piston spaced from said shoulder, a collar slidably received on said small piston and initially abutting said shoulder and one end of said large piston, a compression spring surrounding said small piston and having one end abutting said stop and the other end abutting said collar to initially urge the collar against said shoulder and said large piston, a wall separating said first and second chambers and having a central aperture therein, a check-valving seal in said aperture, the inner end of said small piston engaging said seal and being projectible therethrough into said second chamber when the pressure of the fluid in the first chamber equalizes the pressure exerted by the compression spring on the large cylinder whereby the first chamber becomes a low pressure chamber and the second cylinder becomes a high pressure chamber, a second spring interposed between said separating wall and the other end of said large piston to urge the large piston to its initial position with respect to the small piston as the small piston is retracted from the second fluid chamber.

JOHN T. RISSE.

REFERENCES CITED

The following references are of record in the file of this patent:

UNITED STATES PATENTS

| Number | Name | Date |
| --- | --- | --- |
| 763,833 | Albree | June 28, 1904 |
| 1,985,588 | Tatter | Dec. 25, 1934 |
| 2,102,834 | Carroll | Dec. 21, 1937 |
| 2,106,304 | McGee | Jan. 25, 1938 |
| 2,373,679 | Hawley | Apr. 17, 1945 |
| 2,531,705 | Schultz | Nov. 28, 1950 |